United States Patent
Bernheim et al.

(10) Patent No.: US 7,286,497 B2
(45) Date of Patent: Oct. 23, 2007

(54) LOOK UP TABLE FOR QRT

(75) Inventors: Henrik Bernheim, Bellevue, WA (US); W. Carl Day, Phoenix, AZ (US); Jeff Battin, Duvall, WA (US); Andy E. Rostron, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 1044 days.

(21) Appl. No.: 10/183,383

(22) Filed: Jun. 28, 2002

(65) Prior Publication Data

US 2004/0001451 A1   Jan. 1, 2004

(51) Int. Cl.
*H04B 7/00* (2006.01)

(52) U.S. Cl. .................... 370/310.2; 370/312

(58) Field of Classification Search ............. 370/310.2, 370/312
See application file for complete search history.

(56) References Cited

U.S. PATENT DOCUMENTS

| | | | |
|---|---|---|---|
| 5,539,824 A * | 7/1996 | Bjorklund et al. .......... 380/249 |
| 5,572,522 A * | 11/1996 | Calamvokis et al. ....... 370/390 |
| 5,577,035 A | 11/1996 | Hayter et al. |
| 5,684,797 A | 11/1997 | Aznar et al. |
| 5,701,300 A | 12/1997 | Jeon et al. |
| 5,774,465 A | 6/1998 | Lau et al. |
| 5,852,606 A * | 12/1998 | Prince et al. .......... 370/395.53 |
| 5,917,819 A | 6/1999 | Yang et al. |
| 5,936,959 A | 8/1999 | Joffe |
| 6,016,313 A * | 1/2000 | Foster et al. ................ 370/330 |
| 6,044,077 A | 3/2000 | Luijten et al. |
| 6,216,167 B1 | 4/2001 | Momirov |
| 6,278,714 B1 * | 8/2001 | Gupta ........................ 370/422 |
| 6,349,323 B1 * | 2/2002 | Wakizaka ................... 709/200 |
| 6,973,089 B1 * | 12/2005 | Linsky et al. .......... 370/395.31 |

* cited by examiner

*Primary Examiner*—Hassan Kizou
*Assistant Examiner*—Anthony Sol
(74) *Attorney, Agent, or Firm*—Duane Morris LLP

(57) ABSTRACT

A collection of methods of operating in a point-to-multipoint communication system with a base station and a plurality of remote stations, wherein the communication system maximizes the number of potential connections to each multipoint destination through the creation of an extended Asynchronous Transfer Mode (ATM) cell that examines the switch tag and generates an embedded output channel identifier, wherein the output channel identifier is utilized as an index for broadcast domains and selection of a Temporary Remote Path Identifier (TRPI) comprised of a series of remote station identifiers.

50 Claims, 6 Drawing Sheets

Example Channel Routing Table

| Index | | TRPI |
|---|---|---|
| Dec. | Hex. | Dec. |
| 0 | 0000 | 21 |
| 1 | 0001 | 23 |
| 2 | 0002 | 22 |
| 3 | 0003 | 0 |
| 4 | 0004 | 0 |
| 5 | 0005 | 24 |
| 6 | 0006 | 21 |
| 7 | 0007 | 24 |
| ... | ... | ... |
| 1024 | 0400 | 0 |
| 1025 | 0401 | 23 |
| 1026 | 0402 | 21 |
| ... | ... | ... |
| 2048 | 0800 | 255 |
| ... | ... | ... |
| 3072 | 0C00 | 0 |
| ... | ... | ... |
| 4095 | 0FFF | 0 |

FIGURE 5

LOOK UP TABLE FOR QRT

CROSS REFERENCE TO RELATED APPLICATIONS

The present application is related to co-pending and commonly assigned PCT International Application No. PCT/US02/03323 entitled "Dynamic Bandwidth Allocation", PCT/US02/03322 entitled "Demodulator Bursty Controller Profile", PCT/US02/03193 entitled "Demodulator State Controller", PCT/US02/03189 entitled "Frame to Frame Timing Synchronization", the disclosures of which are hereby incorporated herein by reference. The aforementioned applications are related to commonly assigned U.S. Pat. No. 6,016,313 entitled "System and Method for Broadband Millimeter Wave Data Communication" issued Jan. 18, 2000 and currently undergoing two re-examinations under application Ser. No. 90/005,726 and application Ser. No. 90/005,974, U.S. Pat. No. 6,404,755 entitled "Multi-Level Information Mapping System and Method" issued Jun. 11, 2002, U.S. patent application Ser. No. 09/604,437, entitled "Maximizing Efficiency in a Multi-Carrier Time Division Duplex System Employing Dynamic Asymmetry", which are a continuation-in-part of the U.S. Pat. No. 6,016,313 patent which are hereby incorporated herein by reference.

The present application is related to and is being concurrently filed with commonly assigned U.S. patent application Ser. No. 10/183,383, entitled "Look-Up Table for QRT", U.S. patent application Ser. No. 10/183,488 entitled "Hybrid Agent-Oriented Object Model to Provide Software Fault Tolerance Between Distributed Processor Nodes, U.S. patent application Ser. No. 10/183,486, entitled "Airlink TDD Frame Format", U.S. patent application Ser. No. 10/183,492, entitled "Data-Driven Interface Control Circuit and Network Performance Monitoring System and Method", U.S. patent application Ser. No. 10/183,490, entitled "Virtual Sector Provisioning and Network Configuration System and Method", U.S. patent application Ser. No. 10/183,489, entitled "System and Method for Supporting Automatic Protection Switching Between Multiple Node Pairs Using Common Agent Architecture", U.S. patent application Ser. No. 10/183,384, entitled "System and Method for Transmitting Highly Correlated Preambles in QAM Constellations", the disclosures of which is hereby incorporated herein by reference.

BACKGROUND OF THE INVENTION

Point-to-Point communication systems are prevalent in which data is transferred from one computer network to another through a switch network. An Asynchronous Transfer Mode (ATM) network is an example of such a point to point communication system.

A typical ATM network consists of multiple interconnected ATM switch nodes, ingress and egress portals to and from other networks or equipment. As ATM cells enter ingress ports and traverse the network, the ATM switches examine each ATM cell header to determine where to send the cell. The cell might pass to another ATM switch or to an egress portal. In all cases, the interconnections between nodes are Point-to-Point, meaning any one port connects to just one other port.

ATM networks are circuit-switched connection-oriented networks, as opposed to broadcast or packet-switched connectionless networks. A circuit-switched network requires the establishment of a circuit before data can flow. The ATM standards define ATM circuits as Virtual connections (VC); each comprising a sequence of fixed length cells from a single point of origin to a single destination point. A virtual connection may be either a virtual channel or a virtual path. A virtual channel is a single point to point data connection, such as a telephone call. A virtual channel is unidirectional; it takes two channels, one in each direction, to establish a bi-direction connection. A virtual path is a group of virtual channels all following the same route. An ATM network conveying a virtual path should not be aware of the number of virtual channels carried within. The VC set up phase determines the route of cells through the network; all cells belonging to a virtual connection follow the exact same path through the network.

ATM networks rely on a switch tag embedded in the header of each cell to determine how to direct the cell. ATM switches in the path extract the switch tag and perform some calculation to determine the output port that leads to the next node. The numerical value of a switch tag is significant only to the two nodes on each end of each point to point interconnection. Each node typically translates the switch tag to a new value before passing the cell to the next node. Since the switch tag value is only locally significant, an outside observer cannot identify the endpoint destination of a cell by examining the switch tag; it is the virtual connection setup phase that determines the paths. Switch tag translation permits multiplexing of VCs from multiple sources with identical switch tag numbering onto a shared physical carrier.

In contrast to an ATM network, Point-to-Multipoint networks are connectionless and frequently rely on a shared broadcast medium to communicate. For example, an Ethernet LAN subnet contains one or more "broadcast domains". Each broadcast domain connects all of its nodes onto a shared medium, such as interconnected copper wire. Whenever one node transmits a data packet, all other nodes in the broadcast domain receive the packet. Each node examines an IP destination address within every data packet and keeps only those packets with an IP address matching the recipient's address.

Data packet traffic between broadcast domains propagate based on the destination IP address. Unlike ATM networks, the destination IP address identifies the endpoint of the packet; the destination identifier doesn't change as the packet travels from node to node. All nodes have a way to determine which of its ports lead toward the destination node. Packets bound for the same destination may follow different paths as well. At any point in the network, the routing tag can tell an outside observer the destination of each packet. This forwarding technique is labeled "packet switching" and is the primary data transfer technique of the Internet.

Multicasting or point-to-multipoint transmission of data messages is accomplished in prior art Point-to-Point communication systems by making multiple copies of the data message and routing through a switch network to each of the intended recipients, ATM cells are typically multicast by this method. However difficulties arise in attempting to multicast data messages in a wireless or broadcast environment. Wireless systems, such as U.S. Pat. No. 6,016,313 which is incorporated herein by reference, don't route, they broadcast. All recipients within transmission range of and compatible with the transmitter receive the broadcast data messages. Therefore informing the recipients which data messages are intended for them is essential.

ATM cells contain switch tags, as discussed above, that contain all routing information necessary to direct a cell to its final destination. One solution for broadcasting ATM cells over a broadcast network includes replicating each broadcast cell (ATM cell designated to be transmitted over a broadcast network) and inserting a unique VPI/VCI combination that corresponds to a particular recipient in a broadcast domain. The copies of the broadcast cells each with a VPI/VCI combination unique for each intended recipient are then broadcast to all recipients in the broadcast domain. As such each broadcast cell is broadcast multiple times, once for each intended recipient participating in the multicast. Each remote within the broadcast domain would then look at every broadcast cell's header and keep only the ones containing matching VPI/VCI. In a multicast involving 25 intended recipients within a broadcast domain of 50 remote stations, the same broadcast cell would be replicated and broadcast 25 times. Each of the fifty remote stations would have to examine each of the 25 broadcast cells to determine if they were the intended recipients. As a result 25 cells would be broadcast and the header of the cells would be examined 1250 times by the remotes, all in the attempt to send the same message to 25 recipients. This approach is obviously an inefficient solution.

Additionally when broadcasting to a plurality of remotes, it is necessary to consider the individual capabilities of each of the intended remote stations particularly the Quadrature amplitude modulation (QAM) level. The data messages must be broadcast in a manner receivable for each of the intended remotes without the requirement of tailoring the transmission to each of the intended remotes. Such tailoring would result in broadcasting the same data message numerous times to account for intended remote stations differences, again resulting in an inefficient use of bandwidth and increased computational load on both the base station and the remote stations. Thus there is a need for an improved method for casting and multicasting data in a broadcast mode.

The subject matter of the present invention adapts a broadcast Point-to-Multipoint architecture to include Point-to-Point traffic.

Multicasting is used synonymously with broadcasting through out the application, however multicasting retains is characteristic of being a subset of broadcasting and thus should not be viewed to narrow the scope to the present invention beyond this characteristic.

SUMMARY OF THE INVENTION

An object of the present invention is to provide a mechanism whereby an underlying routed Point-to-Multipoint network carries switched Point-to-point traffic without compromising the switched nature of the traffic or resulting in inefficient use of bandwidth resources. Another goal is to maximize the number of potential connections to each Multipoint destination. In the context of the invention ATM cells broadcast from a base station to multiple remote stations require a remote station identifier (RSI) to identify which of the remote stations is the intended recipient. Therefore the Point-to-Multipoint portion of the system behaves like a packet switched broadcast domain network carrying circuit-switched data connections.

Additionally, an object of the present invention is a method, a communication system with a base station and a plurality of remote stations, of transmitting ATM cells to a selected remote in a broadcast mode where the cells are addressed without altering the switch tag field (bits) in the ATM Cell header. The method includes creating at the base station an extended ATM cell; examining the switch tag and generating from the switch tag an output channel identifier, representing a single virtual connection. The output channel identifier is embedded in the extended ATM header. The method uses the output channel identifier as an index to a look up table for selecting a remote station identifier (RSI) and the ATM cell accompanied by the RSI is broadcast from the base station Yet another object is a method, in a communication system with a base station and a plurality of remote stations, of transmitting ATM cells to selected remotes in a broadcast mode. The method including creating an extended ATM cell at the base station; examining the switch tag and generating from the switch tag an output channel identifier. The output channel identifier is embedded in the extended ATM header. The method uses the output channel identifier as an index to a first look up table for selecting a broadcast domain and as an index to a second look up table for selecting a TRPI and the ATM cell including a TRPI, wherein the TRPI is the BRSI or the RSI of the intended station or stations.

Still another object of the present invention is directed to a communication system with a base station and plurality of remote stations. The system including a first look up table made up of entries relating output channel identifiers to a set of broadcast domains; and a second look up table made up of entries relating output channel identifiers to a set of temporary remote path identifiers. The system also includes a first queue routing table; a switch fabric; and a second queue routing table and a transmitter. The set of TRPI contains remote station identifiers. The first look up table, second look up table, the first queue routing table, the switch fabric, the second queue routing table and a transmitter are located central to the base station.

These and many other objects and advantages of the present invention will be readily apparent to one skilled in the art to which the invention pertains from a perusal of the claims, the appended drawings, and the following detailed description.

BRIEF DESCRIPTION OF FIGURES

FIG. 5 is an embodiment of a Channel Routing Table in accordance with the present invention

DETAILED DESCRIPTION

Figure 1:
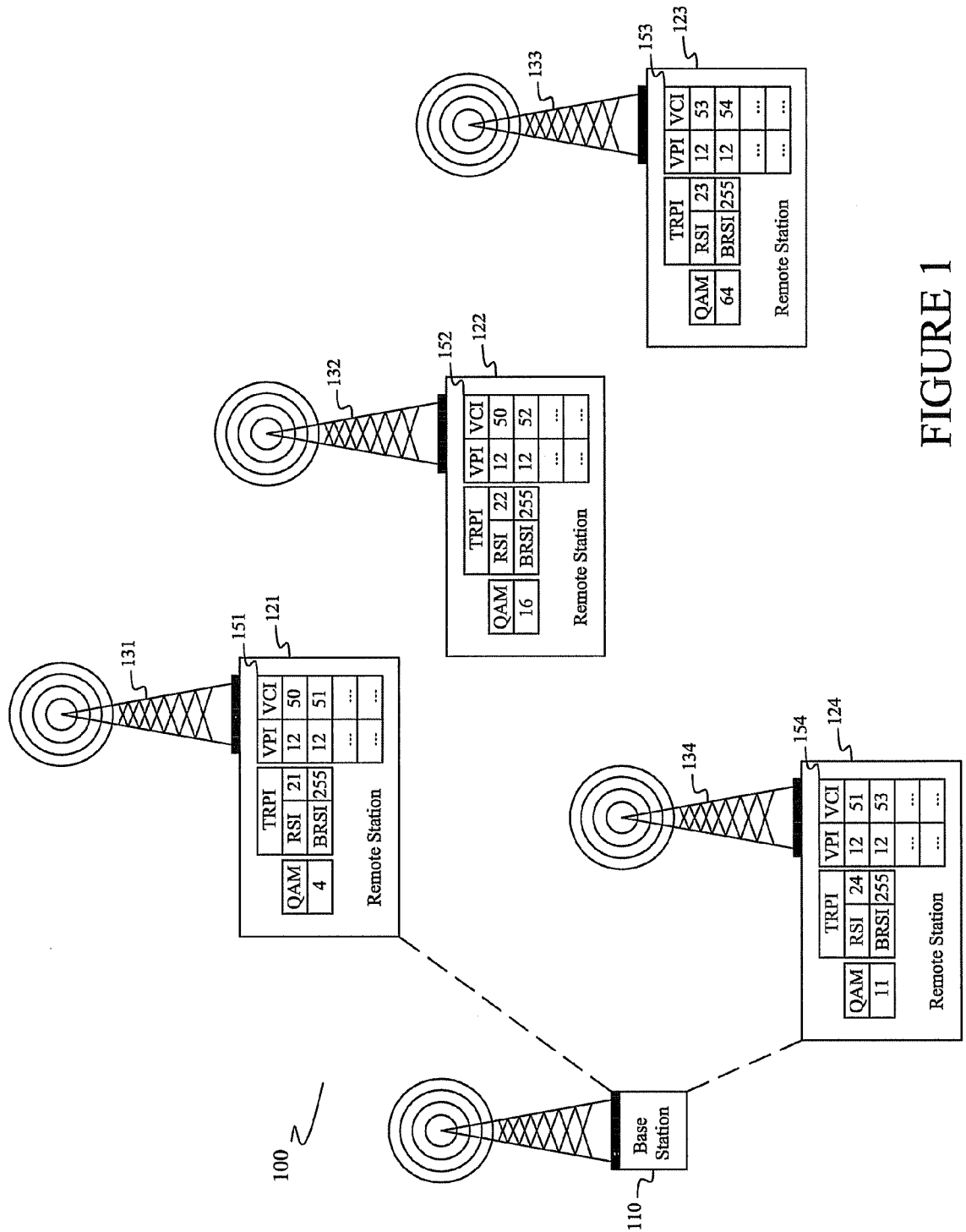
FIG. 1 is a representative point-to-multipoint broadcast system.

FIG. 1 is a representation of a point-to-multipoint communication system with a base station 110 and a plurality of remote stations 121-124. The number of remote stations is not limited to those shown, the remote stations shown are representative of N such remotes. Furthermore, the remote stations can be capable of operating as a base station, the designation of remote station or base station is reflective of the particular role not necessarily the physical properties or instrumentation of the particular station. The communication system 100 may operate as a TDD, TDMA, ATDD or any other applicable wireless platform system allowing for broadband short distance radio communication of bursty data from one computer network to another computer network.

The base station and the remote stations are equipped transmitters and receivers capable of wireless interoperation with each other. The plurality of remote stations may demodulate at different quadrature amplitude modulation levels (QAM). The maximum QAM level for each remote may be a result of instrument limitations of a remote station or as a result of geography (i.e. distance from the base station). The representative remotes in FIG. 1 operate at different QAM levels for illustration purposes only, with remote 121 operating at 4 QAM, remote 122 and remote 124 at 16 QAM, remote 123 at 64 QAM as indicated in FIG. 1. The remotes are capable of demodulating at QAM level up to their maximum QAM levels.

The remotes also have a set of valid switch tags. In figure 1, the set of valid switch tags is composed of VPI/VCI values designated 151-154 respectively for each remote 121-124. The set of valid switch tags may be modifiable as desired.

The remotes also may have one or more broadcast addresses, which represent combinations of all or some of the remotes within a broadcast domain. The broadcast address can be in the form of a RSI in which case it is referred to as a Broadcast Remote Station Identifier (BRSI) or a TRPI in which case it is referred to as a Broadcast Temporary Remote Path Identifier (BTRPI). In the plurality of remotes, as shown in FIG. 1, each remote has a broadcast address of 255, again as shown in FIG. 1. In the preferred embodiment the RSI is an eight-bit number. RSIs between 1 and 128 are reserved for unique remote addresses and the RSIs between 129 and 255 can be reserved for broadcast addresses, with an RSI of 0 being invalid.

The remotes also have a set of valid switch tags. In FIG. 1, the set of valid switch tags is composed of VPI/VCI values designated 150-154 respectively for each remote 120-124. The set of valid switch tags may be modifiable as desired.

In order to allow the transmission of data in a multicast or broadcast mode to the intended remote stations, embedded in each time slot is the multicast address capable of identifying the intended remote station or intended remote stations from the RSI corresponding to a unique remote address or a broadcast address.

Figure 2:
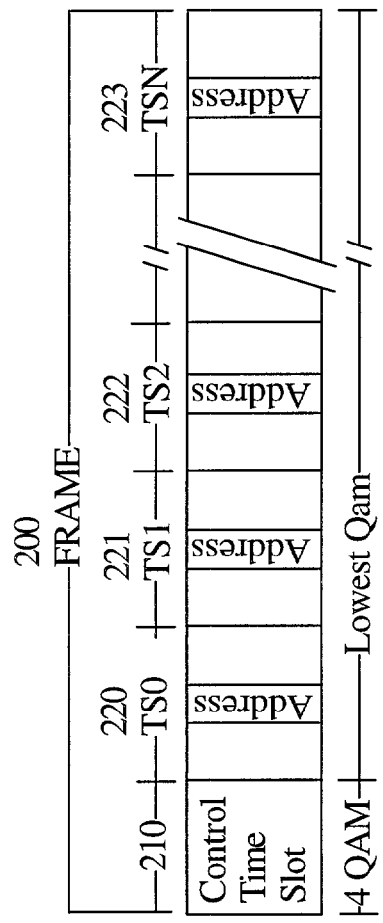
FIG. 2 is an embodiment of a broadcast data frame with multiple time slots of the present invention.

FIG. 2 shows a representation of the format for a frame 200 of data for transmission over the communication system 100. The data can also be in the form of an ATM cell. The frame is divided into a control time slot 210 and N data time slots. Within each multicast data time slot the multicast address is embedded, the multicast address being in the form of a RSI or TRPI. The control time slot 210 is modulated at 4 QAM so that all the remotes whether operating at 4 QAM or higher are able to demodulate the control signal. The multicast data time slots TS0-TSN 220-223 respectively are transmitted at the highest QAM receivable by all the intended remotes, in other words the data is transmitted at the lowest QAM selected from the highest QAM of each of the intended stations. For example, a broadcast intended for remote stations 121, 122 and 123 would be transmitted at 4 QAM, since the highest QAM remote station 121 can receive is 4 QAM and such is the lowest QAM level from the group of intended remotes. If the data in all the time slots of the frame were intended only for remote 123, the data would be transmitted at 64 QAM, since 64 QAM is the highest QAM remote station 123 can receive, and consequently is the lowest maximum QAM level from the group of intended remotes. The base station 110 dynamically determines the lowest QAM level on a frame by frame basis from information about the intended remote stations. Using the above example, a first frame intended for remote stations 121, 122 and 123 would be transmitted at 4 QAM, and a second frame intended for only 123 would be transmitted by the base station at 64 QAM. Such remote station information can be obtained from a database or from information communicated from each of the remote stations. The selection of a maximum QAM level for a particular time slot or frame allows for more efficient use of the available spectrum by increasing information density to the remote stations having suitable communication attributes.

Alternatively, the base station can transmit the data at multiple QAM levels. Where the specific QAM level of each of the intended remotes is not known, but known to be one of a plurality of different QAM levels or is not important to be known, the base station 110 transmits the data with the same multicast address multiple times. The time slots containing the same data and being transmitted at and each of the different QAM levels possible for reception by the intended remote stations.

For illustration, where a broadcast cell is intended for remotes 121-124, yet information regarding the QAM level of remote 121 is not known or is not important, the base station would transmit the control time slot 210 at 4 QAM and TS0 220 would be modulated at 4 QAM. Subsequent time slot TS1 221 would contain the identical data and address as TS0 221 but would be modulated at 16 QAM. Time slot TS2 222 would likewise contain identical information as TS0 220 but would be modulated at 64 QAM. Each remote station can demodulate the control time slot at 4 QAM and the time slots corresponding to its maximum QAM. Therefore the data would be capable of reception by all the remotes, since the data was transmitted at each of the possible QAM levels.

In a communication system using ATM protocol, the unique remote address and the broadcast address are preferably in the form of a TRPI and appended to the beginning of the cell.

Figure 7:
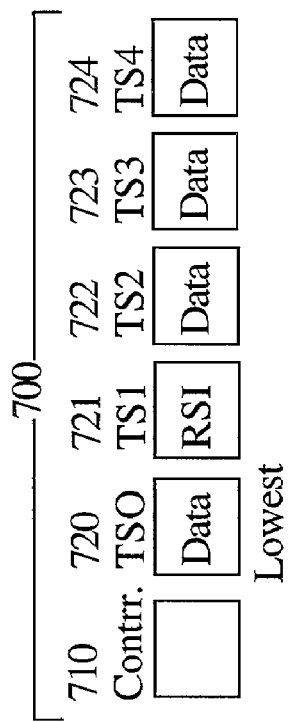
FIG. 7 is an embodiment of a broadcast data frame for a framed protocol communication system

Similarly in a point-to-point communication system using framed protocol, a broadcast address field is inserted in the forward portion of the frame only if the data in the frame is intended for broadcast. FIG. 7 represents much the same frame as FIG. 2, however it is used in system using framed protocol. The frame 700 includes a control time slot 710 and additional time slots T0-TN 720-724 respectively. The frame 700 is intended for broadcast as such a broadcast field is placed in TS0 720. The broadcast field contains address information such as a RSI or TRPI. In the implementation, as shown in FIG. 7, the destination of all the time slots within the frame are governed by the contents of the broadcast field. Whereas in previous implementations, each time slot had it own address that may or may not be similar to other time slots in the frame. Preferably, as shown in FIG. 7, the address field is placed after the control time slot 710. The broadcast field is modulated at the lowest QAM level of the intended remotes as discussed previously.

Figure 3A:
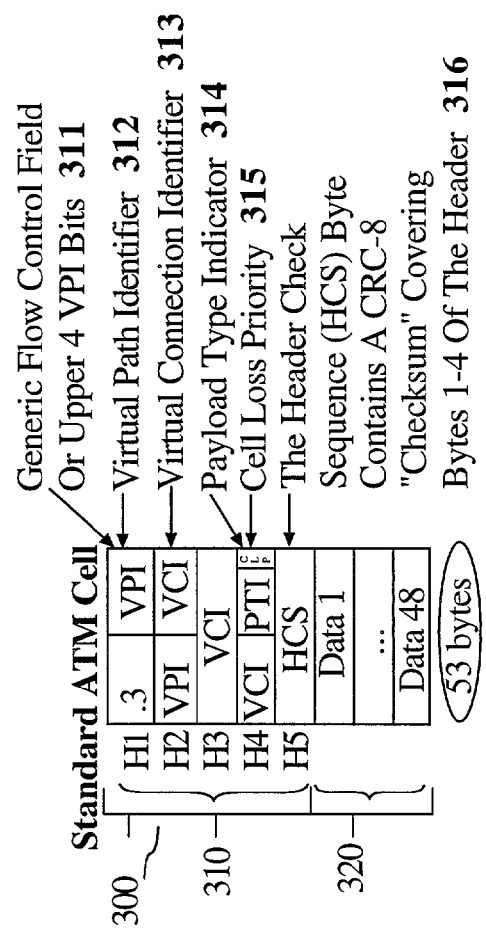
FIG. 3a is a representation of standard ATM cell architecture

In the transmission of ATM cells in a broadcast or multicast manner as described though out, an approach that modifies the standard ATM cell architecture is preferred. FIG. 3a represents a standard ATM cell 300. Standard ATM cell architecture contains a 5 byte header 310 followed by a 48 byte data payload 320. Within the cells header are fields for generic flow control 311, VPI 312, VCI 313, payload type indicator 314, cell loss priority 315 and the header check sequence 316. The cell header contains an 8 bit or 12 bit virtual path indication and a 16 bit virtual channel indication field. The VPI and VCI fields in combination constitute the switch tag described above. The standard ATM cell is 53 bytes.

The standard ATM header fields eligible to contain the routing address or RSI are the switch tag fields, however the modification of these fields are undesirable. The VCI field must be undisturbed when used for Virtual Path connections. It is also unfavorable to place the identifier within the VPI field, since to do so would violate the switched nature of ATM because the VPI must be translatable from node to node. Additionally the VPI is small; embedding a RSI would dramatically restrict the number of usable VC due to unusable or undesirable bit combinations. Due to these limitations, a non-standard or extended ATM cell is preferred.

Figure 3B:
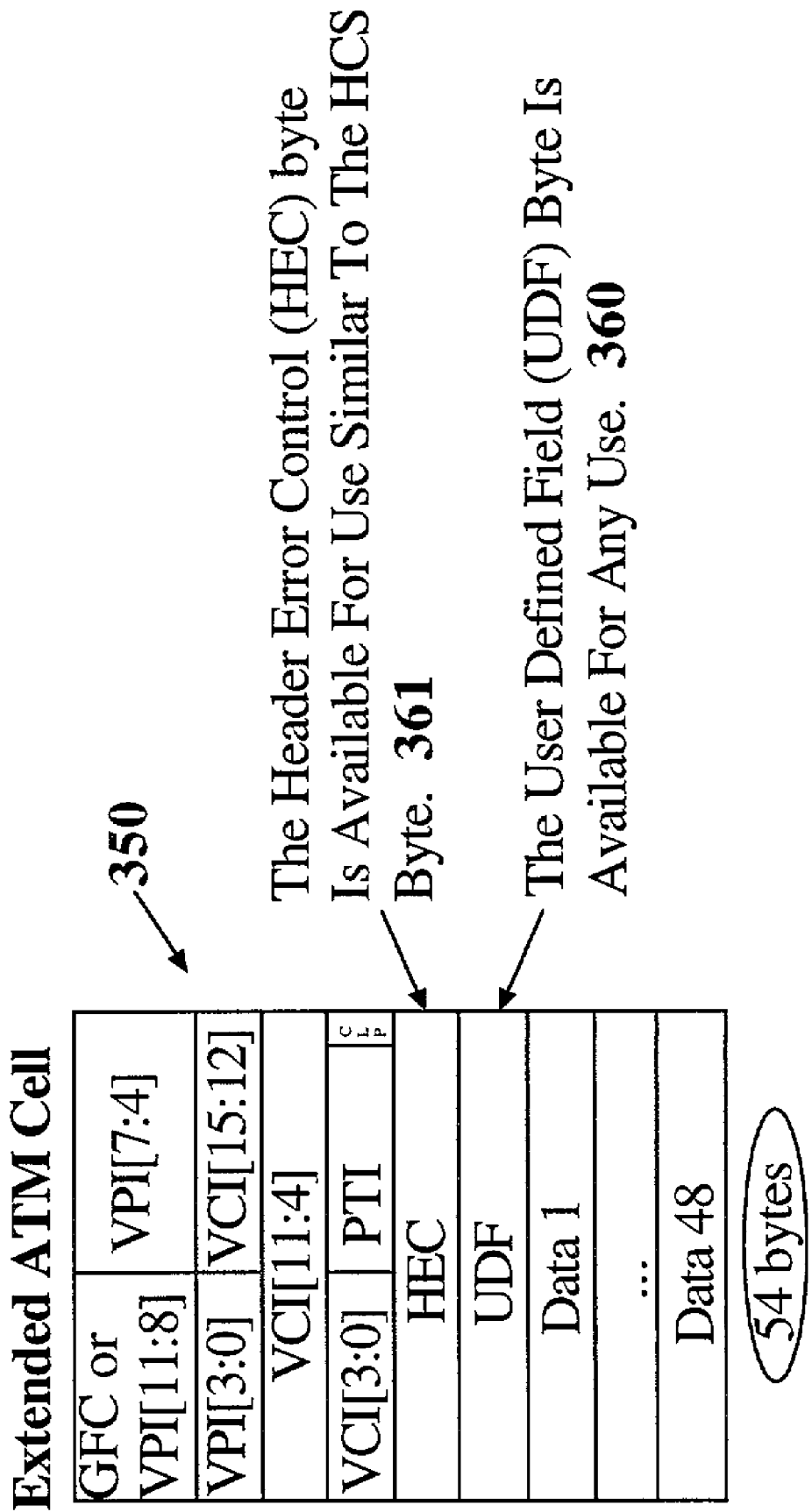
FIG. 3b is an embodiment of an extended ATM cell in accordance with the present invention

The extended ATM cell 350 in FIG. 3b is similar to the standard ATM cell with the addition of a User Defined Field (UDF) 360. The Header Error Control Field (HEC) 361 is another name for the HCS field. The UDF is one byte following the cell header fields and preceding the data payload. The extended ATM cell 350 has a size of 54 bytes. An output channel field is contained within the HEC and UDF.

The Output Channel identifier is derived from each cell's switch tag. Each individual Output channel value represents a single VC (virtual connection, either a virtual channel or a virtual path) and acts as a routing tag transporting ATM cells through a core switch fabric. As the cells exit the switch fabric the receiving egress devices examine the Output channel field to identify which output port should receive the cell. There are no restrictions on the value of the output channel identifier; all possible bit combinations are thus useable. The output channel mechanism is not an uncommon feature of industry-standard ATM ingress/Egress device components, in that it doesn't violate the switched nature of ATM because the switch fabric and its ingress and egress devices act collectively as a single node rather than a sequence of nodes.

For the output channel identifier to contain the RSI would require the RSI to pass through one node to another node without being subject to switch tag translation. The cells would have to identify the destination Remote station before translating the cells' switch tag. This would clearly violate the intent of ATM since ATM cells as described previously are switched based on a freely translatable switch tag. Implementing the RSI directly into the Output channel field creates a non-uniform ATM switch design, because not all cells entering the switch fabric are bound for a Point-to-Multipoint broadcast. Since the output channel identifier corresponds to an individual VC, a look up table within the communication system is used to translate the output channel value to a RSI. The look up table permits multiple output channel values per RSI.

Figure 4:
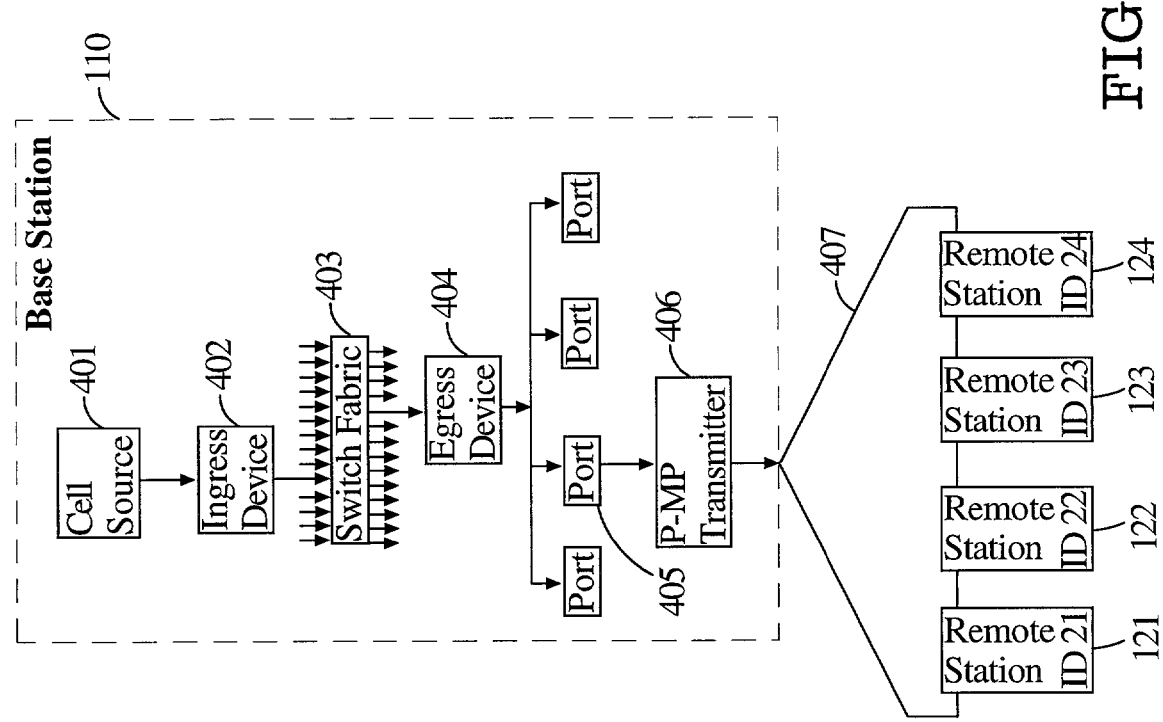
FIG. 4 is an embodiment of a base station in accordance with the present invention

FIG. 4 illustrates the determination of the RSI for an ATM cell. A cell Source 401 forwards all cells for all VC to the switch Fabric ingress device 402. Ingress device 402 examines each cell's switch tag fields and generates two additional fields. The first field is a fabric output tag that tells the switch fabric which Egress device receives the cell. The second field, is the output channel and behaves like an extended VPI field since is derived from the VPI/VCI fields and it dictates to the egress device which port 405 receives the cell. The switch fabric 403 delivers the cell to egress device corresponding to the fabric output tag. Egress device 404 examines the output channel and forwards the cell to the intended port 405, which in turn passes the cell to the P-MP transmitter 406 which broadcasts in broadcast domain 407. The egress device embeds the output channel value within the HEC and UDF fields of the extended ATM cell.

The output channel value has no intrinsic meaning; it is simply an index number into a look-up table within the egress device. The base station software selects an unused output channel number at the time of establishment of each VC.

In the exemplary base station of FIG. 4, the output channel is a 14-bit number that identifies one of 16,384 VC per switch Fabric Egress Device 404. The remaining 2 bits are ignored by Device 404. The Egress device identifies the destination port using the output channel value. If the output channel values are distributed between the ports, then it is convenient for the Egress device to use 2 bits of the output channel to identify the destination port. This results in 4,096 VC per Port, per transmitter, per field. As previously eluded to if the RSI were directly embedded within the output channel field, only 4 bits could be used to describe only 16 possible VPI values per Remote station, thus restricting the number of Virtual paths and most importantly forcing pre-assignment of the Virtual path connection to each remote station. Such preassignment would prevent reassignment to other remote station, because the output channel would contain the RSI. In this example the remaining 4,016 output channel values would be unusable.

FIG. 5 is an abbreviated exemplary look up table for a Point-to-Point transmitter with initialized entries. The base station sets up several VC and corresponding output channel values for each remote:
  Remote Station 121 with a RSI of 21 has VCs at entry 0,6, and 1026;
  Remote Station 122 with a RSI of 22 has a VC at entry 2;
  Remote Station 123 with a RSI of 23 has VCs at entry 1, 1025;
  Remote Station 124 with a RSI of 24 has VCs at entry 5 and 7.

Using the look up table in FIG. 5, if the switch fabric ingress device injects a cell into the switch fabric accompanied by an output channel value of 1025, the transmitter 406 will use 1025 as the index into the Look up table and retrieve the RSI "23". The transmitter than broadcasts the cell into region 407. Remote 123 will accept the cell and all the other remotes reject the cell.

A benefit of using the look up table is the 4,096 output channel numbers may be assigned to the remote stations within field 407 in any combination. Thus the number of VC as reflected by the output channel values is independent of the number of remotes and furthermore the number of VC per a particular remote is independent of the total number of VC. In the example in FIG. 4, there can be one output channel assigned to each remote station 121, 122, 123 and the remaining 4093 output channels assigned to remote station 124. Or the 4096 output channel might be distributed as evenly as possible depending upon the needs of the system.

An additional took up table can be used in conjunction with the output channel identifier to determine which transmitter or broadcast domain the intended remote stations are associated with. The use of the additional look up table allows variable assignments of the designated output channel bit values to the available transmitters.

Figure 6:
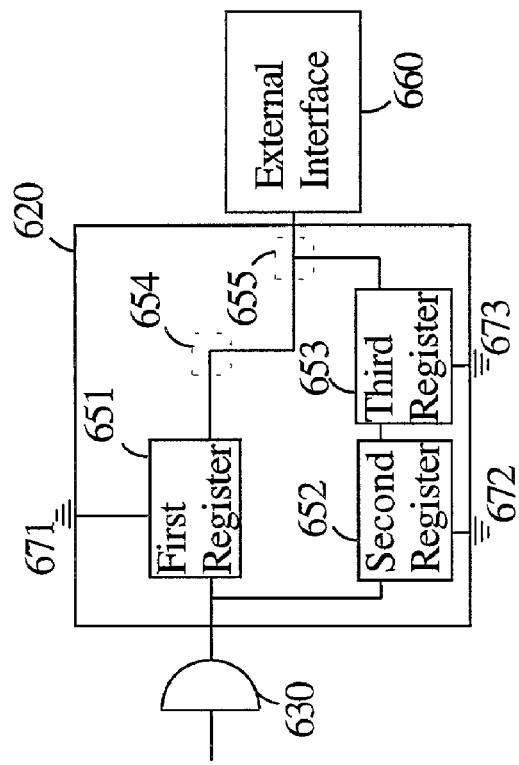
FIG. 6 is an embodiment of a remote station circuit of the present invention.

FIG. 6 is a representation of a circuit 620 within each of a plurality of remotes. The circuit at each remote station evaluates the RSI and switch tag field portions of received ATM cells. ATM cells are standardized frames with a data payload and a header containing routing and other control information. The routing information includes the switch tags VPI/VCI.

An ATM cell broadcast from the base station 110 is received at all of the remotes within range of the transmission. The circuit evaluates the RSI of the ATM cell to determine if the RSI matches the unique remote address of the evaluating remote. Upon determining a match indicating the ATM cell is intended for the particular remote, the cell is then routed to an external interface. The cells are directed via information provided by the cell's switch tag. A cell with a RSI matching the unique remote address should necessarily have a valid switch tag as it would represent a point to point transmission to that particular remote station. However, it may be desirable to evaluate the validity of the switch tag prior to routing.

The circuit 620 also evaluates the RSI of the ATM cell to determine if the RSI matches a broadcast address or BRSI of the evaluating remote station. The remote station may have a plurality of broadcast addresses, each corresponding to different combinations of remote stations. Upon determining a match of the broadcast address BRSI of the cell, the remote station evaluates the validity of the switch tag. Each remote has an assigned set of valid switch tags. If the switch tag is valid, the ATM cell is routed to an external interface 660, again directed via information provided by the cells switch tag. In evaluating the switch tag, the VPI/VCI may be used or alternatively the VPI only. Each remote may have multiple switch tag filters, each switch tag filter corresponding to a respective switch tag that is a set of switch tags assigned to each remote for evaluating the validity of the ATM cell's switch tag. ATM cells that are not passed to the router or with invalid switch tags are discarded by the receiving remote.

By way of illustration, the base station 10 broadcasts an ATM cell intended for remote station 121. The ATM cell is transmitted at 4QAM, the determination of which was described earlier. The ATM cell has appended RSI of "21" and a switch tag VPI/VCI of 12/50. The ATM cell is received at all the remotes in transmission range, which includes remotes 121, 122, 123 and 124. Remote station 121 receives the signal and demodulates the ATM cell and gleans the RSI and switch tag information from the cell. The RSI is evaluated by the circuit 620 and matches it to the unique remote address. The cell is then routed through the external interface 660 via the switch tag information.

The signal with the ATM cell is also received at remotes 122, 123, and 124. The RSI is compared to the unique remote address of each remote and in this example will not match. Simultaneously or sequentially the non-intended remotes compare the RSI to the broadcast address of each remote, and again in this example does not match. As a result the cell is discarded from each non-intended remote. The result is a point-to-point transmission of the cell in a broadcast mode.

In another example, base station 110 broadcasts an ATM cell intended for remotes 122 and 123. The ATM cell is transmitted at 16 QAM, with an appended RSI of "255", which is the broadcast address for all of the remotes, and a switch tag VPI/VCI of 12/53. The signal containing the cell is received at each remote, and upon evaluation it is found that the RSI does not match any of the unique remote addresses of the remotes. However, the RSI is found to match a broadcast address for each of the remotes. The cell's switch tag is then evaluated at each remote. The cell's switch tag is within the set of valid switch tags assigned to remotes 122 and 123 as seen in FIG. 1, and thus the cell is routed through the external interface 660. In remotes 121 and 124, not withstanding the QAM level, the cells switch tag is not within the set of valid switch tags assigned to them and therefore the cell is discarded. The result being that the ATM cell was multicast to remotes 122 and 123 in a broadcast mode.

In a particular embodiment as shown in FIG. 6, the ATM cells are received at the remote station via receiver 630. The cells are applied in parallel to a $1^{st}$ register 651 and a $2^{nd}$ register 652. The $1^{st}$ register attempts to match the RSI of the cell with the unique remote address of the receiving remote. Upon a match the cells are transmitted to an external interface 660 where it is routed, absent a match the signal containing the ATM cells is discarded via ground 671. The particular design of the registers and their operation are readily known and not discussed further.

The $2^{nd}$ register also receiving the signal containing the ATM cell attempts to match the RSI with the broadcast address or BRSI of the receiving remote. Upon a match, the cells are sent to a $3^{rd}$ register which is connected in series to the second register, absent a match the signal is discarded via ground 672. The $3^{rd}$ register attempts to validate the switch tag of the cell with the set of valid switch tags assigned to the receiving remote. Upon a determination at the $3^{rd}$ register that the switch tags are valid the cells are transmitted to an external interface 660 for appropriate routing via information from the switch tag. Again, if the switch tag is invalid the signal with the cell is discarded via ground 673.

A $4^{th}$ register 654, if desired, can also be placed in series with the first register 651 to evaluate the switch tags of the cell prior to being routed to the external interface. Alternatively the $3^{rd}$ register can be in series with both the $1^{st}$ and $2^{nd}$ registers in position 655 and thus evaluate the switch tag of a cell matching the unique remote address or broadcast address.

While the present invention have been described, it is to be understood that the embodiments herein are illustrative only and the scope of the invention is to be defined solely by the appended claims when accorded a full range of equivalence, many variation and modification naturally occurring to those of skill in the art from a perusal here of.

What is claimed is:

1. In a communication system with a base station and a plurality of remote stations each remote station having a remote station identification a method of transmitting ATM cells to a selected remote in a broadcast mode where the cells are addressed to the remote station without altering switch tag field bits in the ATM Cell header comprising the steps of:
   creating at the base station an extended ATM cell;
   examining the switch tag and generating from it an output channel identifier, wherein each output channel identifier represents a single virtual connection;
   embedding the output channel identifier in the header of the extended ATM cell;
   using the output channel identifier as an index to a look up table for selecting a RSI (Remote Station Identifier) for the selected remote station;
   broadcasting from the base station, the extended ATM cell including the RSI.

2. The method of claim 1 further comprising the steps of:
   receiving at remote stations within the plurality of remote stations the RSI and the ATM cells;
   comparing the receiving remote station's RSI with the RSI of the ATM cell;
   discarding the cells if the receiving remote station's RSI and the ATM cell's do not match; and, forwarding the cells to an external interface if the receiving remote station's RSI and the ATM cell's RSI match.

3. The method of claim 1, wherein the communication system is a time division duplex communication system.

4. The method of claim 3, wherein the communication system is an adaptive time division duplex communication system.

5. The method of claim 4, wherein the communication system is for broadband short distance radio communication of bursty data from one computer network to another computer network.

6. The method of claim 5, wherein the extended ATM cell includes an output channel field in the header.

7. The method of claim 6, wherein the output channel field is between the switch tag field and the data field.

8. The method of claim 6, wherein the output channel field includes a header Error Control field (HEC) and a user defined field (UDF).

9. The method of claim 6, wherein the output channel field is 2 bytes in length.

10. The method of claim 6, wherein the output channel identifier is embedded in the output channel field of the extended ATM cell.

11. The method of claim 5, wherein the base station includes an ingress device, a switch fabric, an egress device and a point to multipoint transmitter.

12. The method of claim 11, wherein the step of examining the switch tag and generating from the switch tag an output channel identifier is preformed by the ingress device; and, wherein the step of embedding the output channel identifier in the header of the extended ATM cell is preformed by the egress device.

13. The method of claim 5, wherein the look up table relates output channel identifiers to remote station identifiers.

14. The method of claim 13, wherein each output channel identifier relates to no more than one remote station identifier.

15. The method of claim 14, wherein each RSI corresponds to one or more output channel identifiers.

16. The method of claim 13, wherein available channels represented by the output channel identifiers are selectively assignable to remote stations.

17. The method of claim 5, wherein the switch tag is a VPI/VCI.

18. The method of claim 5, wherein the communication system operates in the range of 2-60 Ghz.

19. The method of claim 13, wherein each output channel identifier and related RSI entry of the look up table are readily modifiable permitting reuse of table entries.

20. In a communication system with a base station and a plurality of remote stations each remote station with an RSI (Remote Station Identifier) and within at least one broadcast domain, a method of transmitting ATM cells to selected remotes in a broadcast mode comprising the steps of:

creating at the base station an extended ATM cell;
examining the switch tag and generating from it an output channel identifier;
embedding the output channel identifier in the header of the extended ATM cell;
using the output channel identifier as an index to a first look up table for selecting a broadcast domain and as an index to a second look up table for selecting a TRPI (Temporary Remote Path Identifier) and, broadcasting in the selected broadcast domain from the base station, the ATM cell including the TRPI, wherein the TRPI is a BRSI (Broadcast Remote Station Identifier) or the RSI.

21. The method of claim 20, comprising the steps of:
receiving at the plurality of remote stations within range of the base station the ATM cells accompanied by TRPI;
comparing, at each of receiving remote stations, the receiving remote station's RSI with the TRPI of the ATM cell;
forwarding the ATM cells to an external interface if the receiving remote station's RSI and the ATM cell's TRPI match;
comparing, at each of the receiving remote stations, the receiving remote station's BRSI with the TRPI of the ATM cell;
evaluating the validity of the ATM cell's switch tag with the remote stations, if the receiving remote station's BRSI and the ATM cell's TRPI match;
forwarding the ATM cells to an external interface, if the ATM cell's switch tag is valid;
discarding the ATM cell if the switch tag is not valid; and,
discarding the ATM cell if the receiving remote station's BRSI or RSI and the ATM cell's TRPI do not match.

22. The method of claim 20, wherein the communication system is a time division duplex communication system.

23. The method of claim 22, wherein the communication system is an adaptive time division duplex communication system.

24. The method of claim 23, wherein the communication system is for broadband short distance radio communication of bursty data from one computer network to another computer network.

25. The method of claim 24, wherein the extended ATM cell includes an output channel field in the header.

26. The method of claim 25, wherein the output channel field is between the switch tag field and the data field.

27. The method of claim 25, wherein the output channel field includes a header Error Control field (HEC) and a user defined field (UDF).

28. The method of claim 25, wherein the output channel field is 2 bytes in length.

29. The method of claim 25, wherein the output channel identifier is embedded in the output channel field of the extended ATM cell.

30. The method of claim 24, wherein the base station includes an ingress device, a switch fabric, an egress device and a broadcast transmitter.

31. The method of claim 30, wherein the step of examining the switch tag and generating from the switch tag an output channel identifier is preformed by the ingress device; and, wherein the step of embedding the output channel identifier in the header of the extended ATM cell is preformed by the egress device.

32. The method of claim 24, wherein the first look up table relates output channel identifiers to broadcast domains.

33. The method of claim 24, wherein the second look up table relates output channel identifiers to TRPI.

34. The method of claim 33, wherein each output channel identifier corresponds to no more than one TRPI.

35. The method of claim 34, wherein each TRPI corresponds to one or more output channel identifiers.

36. The method of claim 33, wherein available channels represented by the output channel identifiers are selectively assignable to remote stations, with each available channel assignable to no more than one remote station.

37. The method of claim 36, wherein the number of available channels assigned to the remotes is independent of the number of remotes.

38. The method of claim 24, wherein the switch tag is VPI/VCI field.

39. The method of claim 24, wherein the communication system operates in the range of 2-60 Ghz.

40. The method of claim 32, wherein each output channel identifier and related broadcast domain entry of the first look up table are readily modifiable permitting reuse of table entries.

41. The method of claim 33, wherein each output channel identifier and related TRPI entry of the second look up table are readily modifiable permitting reuse of table entries.

42. A communication system with a base station and a plurality of remote stations, said system comprising:
- a first look up table comprising entries relating output channel identifiers to a first set of broadcast domains;
- a second look up table comprising entries relating the output, channel identifiers to a second set of temporary remote path identifiers (TRPI);
- a first queue routing table;
- a switch fabric;
- a second queue routing table and a transmitter;

wherein the second set of TRPI are remote station identifiers or broadcast remote station identifiers;
  wherein the first look up table, second look up table, the first queue routing table, the switch fabric, the second queue routing table and the transmitter are located central to the base station.

43. The method of claim 42, wherein the communication system is a time division duplex communication system.

44. The method of claim 43, wherein the communication system is an adaptive time division duplex communication system.

45. The method of claim 44, wherein the communication system is for broadband short distance radio communication of bursty data from one computer network to another computer network.

46. The system of 45 wherein the plurality of remote stations each comprise:
- a remote station identifier unique to each one of the plurality of remote stations
- a broadcast remote station identifier shared by one or more of the plurality of remote stations;
- a receiver;
- a first filter for accepting received signals where the TRPI matches the BRSI of the receiving remote station
- a second filter for accepting received signals with signals where the TRPI matches the RSI of the receiving remote station; and,
- a third filter for accepting a switch tag assigned to the remote station.

47. The system of claim 46, wherein the first filter and the third filter are in series; and,
  wherein the second filter is in parallel with the first and third filters.

48. The system of claim 45, wherein the transmitter operates in the range of 2-60 Ghz.

49. The system of claim 42, wherein the communication system is a time division multiple access system.

50. In an adaptive time division duplex communication system for broadband short distance radio communication of bursty data from one computer network to another computer network, with a base station and a plurality of remote stations, each remotes station having a remote station identifier, a method of transmitting ATM cells to a selected remote station in a broadcast mode where the cells are addressed to the remote station without altering switch tag field bits in the ATM Cell header comprising the steps of creating at the base station an extended ATM cell;
- examining the switch tag and generating from it an output channel identifier, wherein each output channel identifier represents a single virtual connection;
- embedding the output channel identifier in the header of the extended ATM cell;
- using the output channel identifier as an index to a look up table for selecting a RSI (Remote Station Identifier) for the selected remote station;
- broadcasting from the base station, the extended ATM cell including the RSI.

* * * * *